United States Patent
Darnell et al.

(10) Patent No.: US 9,166,634 B2
(45) Date of Patent: Oct. 20, 2015

(54) ELECTRONIC DEVICE WITH MULTIPLE ANTENNA FEEDS AND ADJUSTABLE FILTER AND MATCHING CIRCUITRY

(71) Applicant: Apple Inc., Cupertino, CA (US)

(72) Inventors: Dean F. Darnell, San Jose, CA (US); Enrique Ayala Vazquez, Watsonville, CA (US); Hongfei Hu, Santa Clara, CA (US); Yuehui Ouyang, Sunnyvale, CA (US); Mattia Pascolini, Campbell, CA (US); Robert W. Schlub, Cupertino, CA (US); Peter Bevelacqua, San Jose, CA (US); Hao Xu, Cupertino, CA (US); Jayesh Nath, Milpitas, CA (US); Yijun Zhou, Sunnyvale, CA (US); Nanbo Jin, Sunnyvale, CA (US); David Pratt, Gilroy, CA (US); Matthew A. Mow, Los Altos, CA (US); Ming-Ju Tsai, Cupertino, CA (US); Liang Han, Sunnyvale, CA (US); Thomas E. Biedka, San Jose, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 13/888,110

(22) Filed: May 6, 2013

(65) Prior Publication Data

US 2014/0329558 A1 Nov. 6, 2014

(51) Int. Cl.
*H04W 88/06* (2009.01)
*H04B 1/04* (2006.01)
*H04B 1/18* (2006.01)

(52) U.S. Cl.
CPC ............... *H04B 1/0458* (2013.01); *H04B 1/18* (2013.01)

(58) Field of Classification Search
CPC ... H04W 88/06; H04W 88/02; H04W 88/022; H04W 88/023; H04W 88/026; H04W 88/027
USPC ............ 455/553.1, 84, 550.1, 575.7, 77, 132, 455/73, 90.3, 566, 552.1, 121, 129; 343/857, 702, 725, 745, 748, 861, 853; 324/629
See application file for complete search history.

(56) References Cited

U.S. PATENT DOCUMENTS

| | | | |
|---|---|---|---|
| 6,218,997 | B1 | 4/2001 | Lindenmeier et al. |
| 6,529,170 | B1 | 3/2003 | Nishizawa et al. |

(Continued)

OTHER PUBLICATIONS

Darnell et al., U.S. Appl. No. 13/368,855, filed Feb. 8, 2012.

(Continued)

*Primary Examiner* — Tan Trinh
(74) *Attorney, Agent, or Firm* — Treyz Law Group; G. Victor Treyz; Michael H. Lyons

(57) ABSTRACT

Electronic devices may include antenna structures. The antenna structures may form an antenna having first and second feeds at different locations. A first transceiver may be coupled to the first feed using a first circuit. A second transceiver may be coupled to the second feed using a second circuit. The first and second feeds may be isolated from each other using the first and second circuits. The second circuit may have a notch filter that isolates the second feed from the first feed at operating frequencies associated with the first transceiver. The first circuit may include an adjustable component such as an adjustable capacitor. The adjustable component may be placed in different states depending on the mode of operation of the second transceiver to ensure that the first feed is isolated from the second feed.

20 Claims, 16 Drawing Sheets

(56) References Cited

U.S. PATENT DOCUMENTS

| | | |
|---|---|---|
| 6,662,028 B1 | 12/2003 | Hayes et al. |
| 6,882,318 B2 | 4/2005 | Nevermann |
| 7,043,285 B2 | 5/2006 | Boyle |
| 7,260,424 B2 | 8/2007 | Schmidt |
| 7,764,245 B2 | 7/2010 | Loyet |
| 2008/0165063 A1* | 7/2008 | Schlub et al. ............... 343/702 |
| 2008/0316117 A1* | 12/2008 | Hill et al. ................... 343/702 |
| 2008/0316121 A1* | 12/2008 | Hobson et al. .............. 343/702 |
| 2009/0251374 A1* | 10/2009 | Degner et al. ............... 343/702 |
| 2010/0279734 A1 | 11/2010 | Karkinen et al. |
| 2011/0021139 A1 | 1/2011 | Montgomery et al. |
| 2011/0183721 A1* | 7/2011 | Hill et al. ................... 455/566 |
| 2011/0241949 A1 | 10/2011 | Nickel et al. |
| 2012/0009983 A1* | 1/2012 | Mow et al. ................. 455/575.7 |
| 2012/0178386 A1* | 7/2012 | Pascolini et al. ............ 455/84 |
| 2012/0231750 A1 | 9/2012 | Jin et al. |
| 2012/0262188 A1* | 10/2012 | Nickel et al. ............... 324/629 |
| 2012/0299785 A1* | 11/2012 | Bevelacqua ................. 343/702 |
| 2013/0039517 A1* | 2/2013 | Nielsen et al. .............. 381/314 |
| 2013/0102357 A1* | 4/2013 | Vance ....................... 455/550.1 |
| 2013/0203364 A1* | 8/2013 | Darnell et al. ............... 455/77 |
| 2014/0073267 A1* | 3/2014 | Cabanillas et al. ........... 455/79 |
| 2014/0287794 A1* | 9/2014 | Akhi et al. ................. 455/550.1 |

OTHER PUBLICATIONS

Bevelacqua et al., U.S. Appl. No. 13/860,396, filed on Apr. 10, 2013.
Vazquez et al., U.S. Appl. No. 13/889,987, filed on May 8, 2013.
Hu et al., U.S. Appl. No. 13/890,013, filed on May 8, 2013.
Bevelacqua et al., U.S. Appl. No. 13/851,471, filed on Mar. 27, 2013.
Jin et al., U.S. Appl. No. 13/846,471, filed on Mar. 18, 2013.
Ouyang et al., U.S. Appl. No. 13/846,459, filed on Mar. 18, 2013.
Zhou et al., U.S. Appl. No. 13/846,481, filed on Mar. 18, 2013.
Hu et al., U.S. Appl. No. 13/366,142, filed on Feb. 3, 2012.
Pascolini et al., U.S. Appl. No. 13/343,657, filed on Jan. 4, 2012.

* cited by examiner

| ACTIVE CELL BAND ON FB | FEED FA FILTER SETTING | | |
|---|---|---|---|
| | C=C1 | C=C2 | C=C3 |
| 700-960 MHz | FA ISOLATION FROM FB IS HIGH. EFFICIENCY FOR FB IS HIGH. | FA ISOLATION FROM FB IS LOW. EFFICIENCY FOR FB IS LOW. | FA ISOLATION FROM FB IS LOW. EFFICIENCY FOR FB IS LOW. |
| 1700-2170 MHz | FA ISOLATION FROM FB IS LOW. EFFICIENCY FOR FB IS LOW. | FA ISOLATION FROM FB IS HIGH. EFFICIENCY FOR FB IS HIGH. | FA ISOLATION FROM FB IS LOW. EFFICIENCY FOR FB IS LOW. |
| 2300-2700 MHz | FA ISOLATION FROM FB IS LOW. EFFICIENCY FOR FB IS LOW. | FA ISOLATION FROM FB IS LOW. EFFICIENCY FOR FB IS LOW. | FA ISOLATION FROM FB IS HIGH. EFFICIENCY FOR FB IS HIGH. |

FIG. 16

ELECTRONIC DEVICE WITH MULTIPLE ANTENNA FEEDS AND ADJUSTABLE FILTER AND MATCHING CIRCUITRY

BACKGROUND

This relates generally to electronic devices, and more particularly, to antenna structures for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry.

To satisfy consumer demand for small form factor wireless devices, manufacturers are continually striving to implement wireless communications circuitry such as antenna components using compact structures. At the same time, it may be desirable to include conductive structures in an electronic device such as metal device housing components. Because conductive components can affect radio-frequency performance, care must be taken when incorporating antennas into an electronic device that includes conductive structures. Moreover, care must be taken to ensure that the antennas and wireless circuitry in a device are able to exhibit satisfactory performance over a range of operating frequencies.

It would therefore be desirable to be able to provide improved antenna structures for wireless electronic devices.

SUMMARY

Electronic devices may include antenna structures. The antenna structures may form an antenna having first and second feeds at different locations. The antenna may be an antenna such as an inverted-F antenna formed from a portion of a conductive housing structure such as a segment of a peripheral conductive housing structure.

A first transceiver may be coupled to the first feed using a first circuit. A second transceiver may be coupled to the second feed using a second circuit. The first and second feeds may be isolated from each other using the first and second circuits. The second circuit may have a notch filter that isolates the second feed from the first feed at operating frequencies associated with the first transceiver. The first circuit may include an adjustable component such as an adjustable capacitor. The adjustable component may be placed in different states depending on the mode of operation of the second transceiver to ensure that the first feed is isolated from the second feed.

Further features of the invention, its nature and various advantages will be more apparent from the accompanying drawings and the following detailed description of the preferred embodiments.

BRIEF DESCRIPTION OF THE DRAWINGS

FIG. 16 is a table showing how adjustment of the circuitry of FIG. 15 may influence antenna performance when using a feed associated with the circuitry of FIG. 14 in accordance with an embodiment of the present invention.

DETAILED DESCRIPTION

Figure 1:
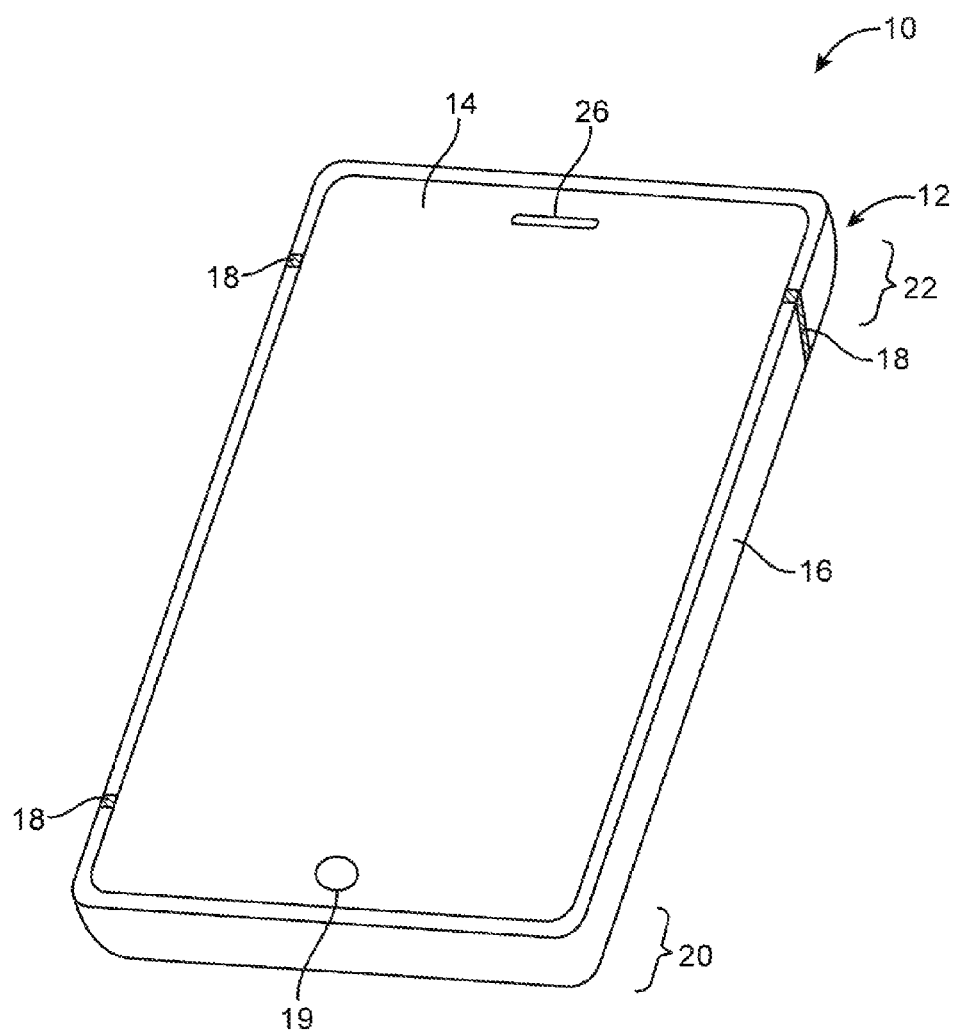
FIG. 1 is a perspective view of an illustrative electronic device with wireless communications circuitry in accordance with an embodiment of the present invention.

Electronic devices such as electronic device 10 of FIG. 1 may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include a peripheral conductive housing structure that runs around the periphery of an electronic device. The peripheral conductive structure may be formed from a peripheral conductive member that serves as a bezel for a planar structure such as a display, may serve as sidewall structures for a device housing, and/or may form other housing structures. Gaps in the peripheral conductive member may be associated with the antennas.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. Parts of housing 12 may be formed from dielectric or other low-conductivity material. If desired, some or all of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable display pixel structures. A display cover layer formed from clear plastic or glass may cover the surface of display 14. Buttons such as button 19 may pass through openings in the display cover layer. The cover layer may also have other openings such as an opening for speaker port 26.

Housing 12 may include peripheral structures 16 formed from a peripheral housing member or other structures. As shown in the example of FIG. 1, member 16 may have a rectangular ring shape that runs around the periphery of device 10 and display 14. Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10 (e.g., by forming a metal band with vertical sidewalls, etc.).

Member 16 may be formed of a conductive material and may therefore sometimes be referred to as a peripheral conductive member or conductive housing structures. Member 16 may be formed from a metal such as stainless steel, aluminum, or other suitable materials. One, two, or more than two separate structures may be used in forming member 16.

It is not necessary for member 16 to have a uniform cross-section. For example, the top portion of member 16 may, if desired, have an inwardly protruding lip that helps hold display 14 in place. If desired, the bottom portion of member 16 may also have an enlarged lip (e.g., in the plane of the rear surface of device 10) and/or may be formed as an integral portion of a planar rear surface structure. In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of housing 12 of the sidewalls of housing 12).

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular member that is welded or otherwise connected between opposing sides of member 16), printed circuit boards, and other internal conductive structures. These conductive structures may be located in the center of housing 12 under display 14 (as an example).

In regions 22 and 20, openings may be formed within the conductive structures of device 10 (e.g., between peripheral conductive structure 16 and opposing conductive structures such as conductive housing structures, a conductive ground plane associated with a printed circuit board, and conductive electrical components in device 10). These openings may be filled with air, plastic, and other dielectrics. Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations. The arrangement of FIG. 1 is merely illustrative.

Portions of peripheral conductive housing structures 16 may be provided with gap structures. For example, structures 16 may be provided with one or more gaps such as gaps 18, as shown in FIG. 1. The gaps may be filled with dielectric such as polymer, ceramic, glass, air, other dielectric materials, or combinations of these materials. Gaps 18 may divide structures 16 into one or more peripheral conductive structure (member) segments. There may be, for example, two segments of structures 16 (e.g., in an arrangement with two gaps), three segments of structures 16 (e.g., in an arrangement with three gaps), four segments of structures 16 (e.g., in an arrangement with four gaps, etc.). The segments of peripheral conductive structures 16 that are formed in this way may form parts of antennas in device 10.

Device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
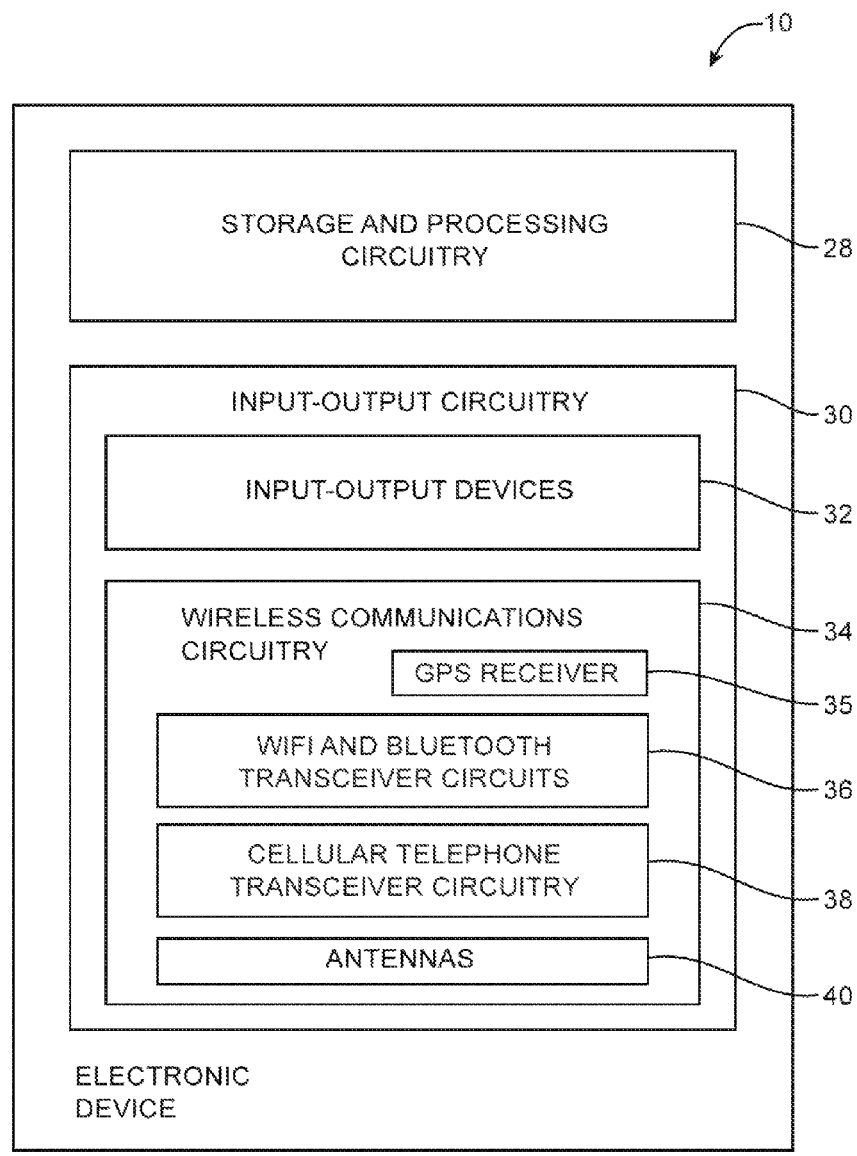
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, adjustable circuitry in filter and impedance matching circuitry, or other adjustable circuits in device 10 to adjust antenna performance. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, may tune an antenna to cover a desired communications band, may configure filter and matching circuitry to isolate a first antenna feed from a second antenna feed, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

If desired, one or more of antennas 40 may be provided with multiple antenna feeds and/or adjustable components. Antennas such as these may be used to cover desired communications bands of interest. For example, a first antenna feed may be associated with a first set of communications frequencies and a second antenna feed may be associated with a second set of communications frequencies. The use of multiple feeds (and/or adjustable antenna components) may make it possible to reduce antenna size (volume) within device 10 while satisfactorily covering desired communications bands.

Figure 3:
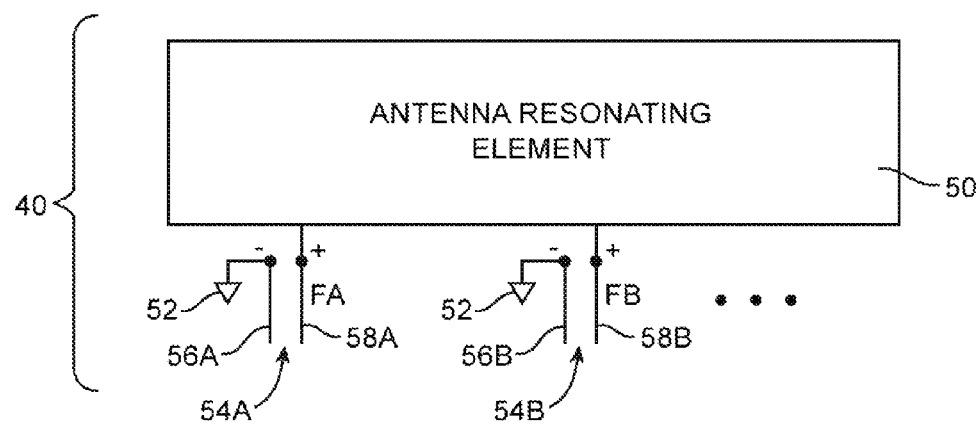
FIG. 3 is a diagram of an illustrative antenna having multiple feeds in accordance with an embodiment of the present invention.

An illustrative configuration for an antenna with multiple feeds of the type that may be used in implementing one or more antennas for device 10 is shown in FIG. 3. As shown in FIG. 3, antenna 40 may have conductive antenna structures such as antenna resonating element 50 and antenna ground 52. The conductive structures that form antenna resonating element 50 and antenna ground 52 may be formed from parts of conductive housing structures, from parts of electrical device components in device 10, from printed circuit board traces, from strips of conductor such as strips of wire and metal foil, or other conductive materials.

Each antenna feed associated with antenna 40 may, if desired, have a distinct location. As shown in FIG. 3, antenna 40 may have a first feed such as feed FA at a first location in antenna 40, a second feed such as feed FB at a second location in antenna 40, and one or more additional antenna feeds at potentially different respective locations of antenna 40.

Each feed may be coupled to an associated set of conductive signal paths using terminals such as positive antenna feed terminals (+) and ground antenna feed terminals (−). For example, path 54A may have a positive conductor 58A that is coupled to a positive antenna feed terminal in feed FA and a ground conductor 56A that is coupled to a ground antenna feed terminal in feed FA, whereas path 54B may have a positive conductor 58B that is coupled to a positive antenna feed terminal in feed FB and a ground conductor 56B that is coupled to a ground antenna feed terminal in feed FB. Paths such as paths 54A and 54B may be implemented using transmission line structures such as coaxial cables, microstrip transmission lines (e.g., microstrip transmission lines on printed circuits), stripline transmission lines (e.g., stripline transmission lines on printed circuits), or other transmission lines or signal paths. Circuits such as impedance matching and filter circuits and other circuitry may be interposed within paths 54A and 54B.

The conductive structures that form antenna resonating element 50 and antenna ground 52 may be used to form any suitable type of antenna.

Figure 4:
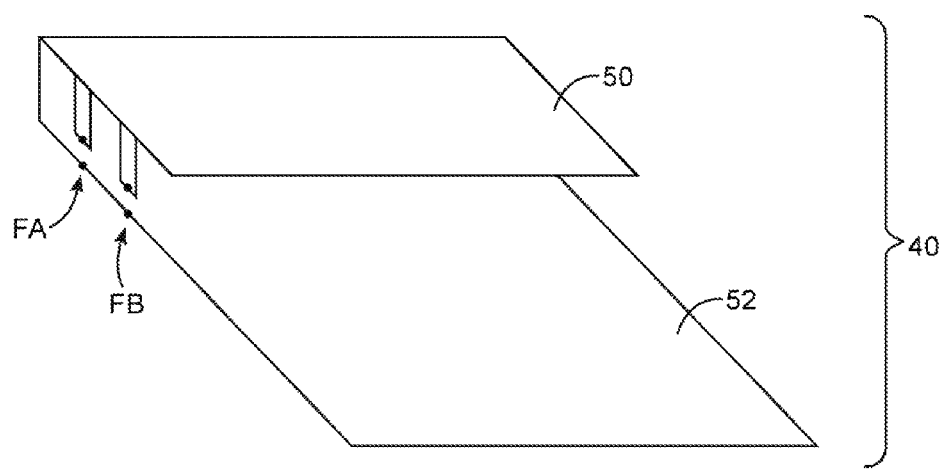
FIG. 4 is a diagram of an illustrative planar inverted-F antenna with multiple feeds in accordance with an embodiment of the present invention.

In the example of FIG. 4, antenna 40 has been implemented using a planar inverted-F configuration having a first antenna feed (feed FA) and a second antenna feed (feed FB).

Figure 5:
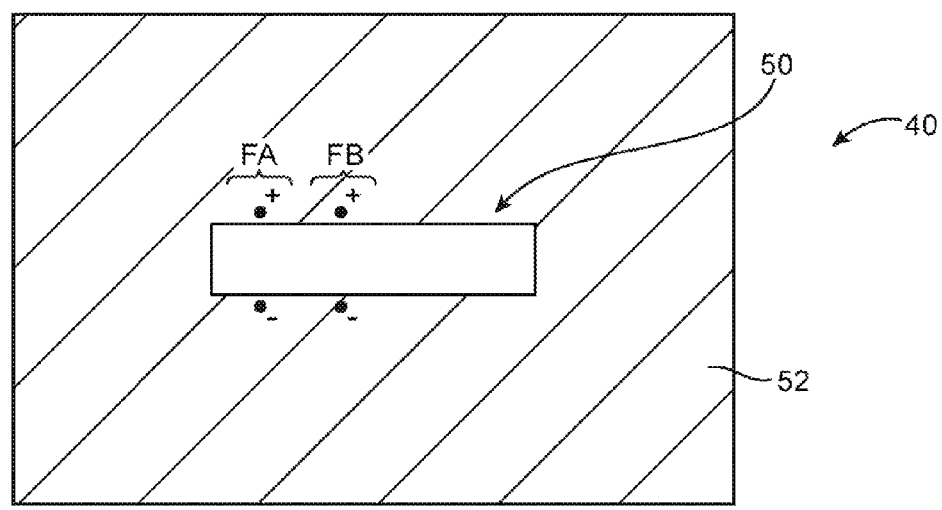
FIG. 5 is a diagram of an illustrative slot antenna with multiple feeds in accordance with an embodiment of the present invention.

FIG. 5 is a top view of an illustrative slot antenna configuration that may be used for antenna 40. In the FIG. 5 example, antenna resonating element 50 is formed from a closed (enclosed) rectangular slot (e.g., a dielectric-filled opening) in ground plane 52. Feeds FA and FB may each have a respective pair of antenna feed terminals (+/−) located at a respective position along the antenna slot.

Figure 6:
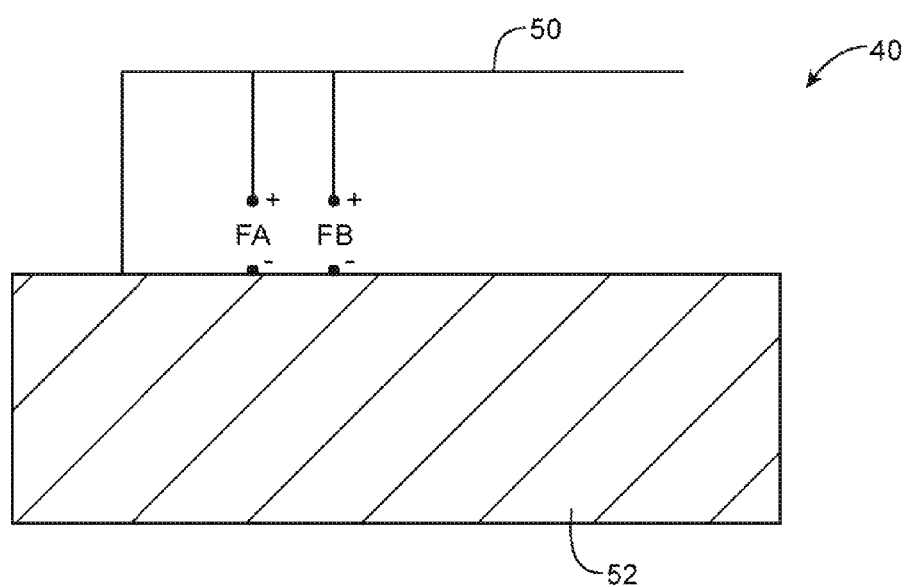
FIG. 6 is a diagram of an illustrative inverted-F antenna with multiple feeds in accordance with an embodiment of the present invention.

In the illustrative configuration of FIG. 6, antenna 40 has been implemented using an inverted-F antenna design. Inverted-F antenna 40 of FIG. 6 has a first antenna feed (feed FA with a corresponding positive terminal and ground terminal) and has a second antenna feed (feed FB with a corresponding positive terminal and ground terminal). Feeds FA and FB may be located at different respective locations along the length of the main resonating element arm that forms inverted-F antenna 40. Inverted-F configurations for antenna 40 with multiple branches such as an inverted-F antenna having short (high band) and long (low band) portions of a shared main resonating element arm or arms of different shapes may be used, if desired.

Figure 7:
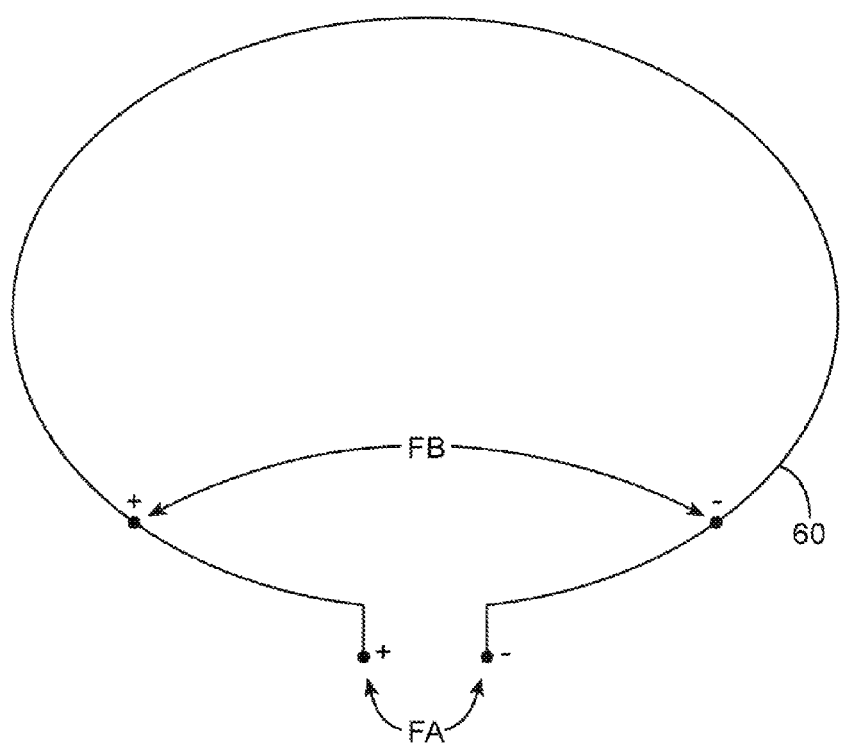
FIG. 7 is a diagram of an illustrative loop antenna with multiple feeds in accordance with an embodiment of the present invention.

FIG. 7 is a diagram showing how antenna 40 may be implemented using a loop antenna configuration with multiple antenna feeds. As shown in FIG. 7, antenna 40 may have a loop of conductive material such as loop 60. Loop 60 may be formed from conductive structures 50 and/or conductive structures 52 (FIG. 3). A first antenna feed such as feed FA may have a positive antenna feed terminal (+) and a ground antenna feed terminal (−) and may be used to feed one portion of loop 60 and a second antenna feed such as feed FB may have a positive antenna feed terminal (+) and a ground antenna feed terminal (−) and may be used to feed antenna 40 at a different portion of loop 60.

The illustrative examples of FIGS. 4, 5, 6, and 7 are merely illustrative. Antenna 40 may, in general, have any suitable number of antenna feeds and may be formed using any suitable type of antenna structures.

Figure 8:
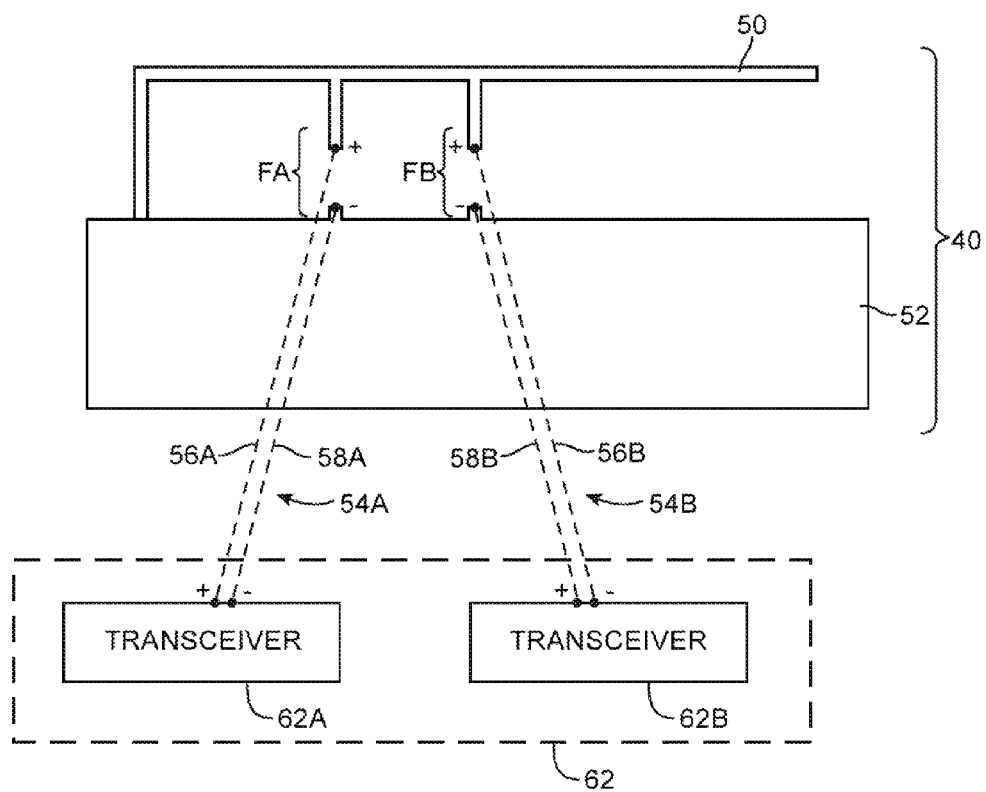
FIG. 8 is a diagram of an inverted-F antenna with multiple feeds showing how radio-frequency transceiver circuitry may be coupled to the feeds using transmission lines in accordance with an embodiment of the present invention.

FIG. 8 shows how antenna 40 may be coupled to transceiver circuitry 62. Antenna 40 of FIG. 8 is an inverted-F antenna, but, in general, any suitable type of antenna may be used in implementing antenna 40. Antenna 40 may have multiple feeds such as illustrative first antenna feed FA with a positive antenna feed terminal (+) and a ground antenna feed terminal (−) and illustrative second antenna feed FB with a positive antenna feed terminal (+) and ground antenna feed terminal (−). Path 54A may include one or more transmission line segments and may include positive conductor 56A and ground conductor 58A. Path 54B may include one or more transmission line segments and may include positive conductor 56B and ground conductor 58B. One or more circuits such as filter circuits and impedance matching circuits and other circuits (not shown in FIG. 8) may be interposed within paths 54A and 54B. Transceiver circuitry 62 may include radio-frequency receivers and/or radio-frequency transmitters such as transceivers 62A and 62B.

Path 54A may be coupled between a first radio-frequency transceiver circuit such as transceiver 62A and first antenna feed FA. Path 54B may be used to couple a second radio-frequency transceiver circuit such as transceiver 62B to second antenna feed FB. Feeds FA and FB may be used in transmitting and/or receiving radio-frequency antenna signals. Transceiver 62A may include a radio-frequency receiver and/or a radio-frequency transmitter. Transceiver 62B may also include a radio-frequency receiver and/or a radio-frequency transmitter.

As an example, transceiver 62A may include a satellite navigation system receiver and transceiver 62B may include a cellular telephone transceiver (having a cellular telephone transmitter and a cellular telephone receiver). As another example, transceiver 62A may have a transmitter and/or a receiver that operate at frequencies associated with a first communications band (e.g., a first cellular or wireless local area network band) and transceiver 62B may have a transmitter and/or a receiver that operate at frequencies associated with a second communications band (e.g., a second cellular or wireless local area network band). Other types of configurations may be used, if desired. Transceivers 62A and 62B may be implemented using separate integrated circuits or may be integrated into a common integrated circuit (as examples). One or more associated additional integrated circuits (e.g., one or more baseband processor integrated circuits) may be used to provide transceiver circuitry 62 with data to be transmitted by antenna 40 and may be used to receive and process data that has been received by antenna 40. Baseband processors and other control circuitry 28 may also be used in controlling settings for antenna 40 during wireless operation of device 10.

Figure 9:
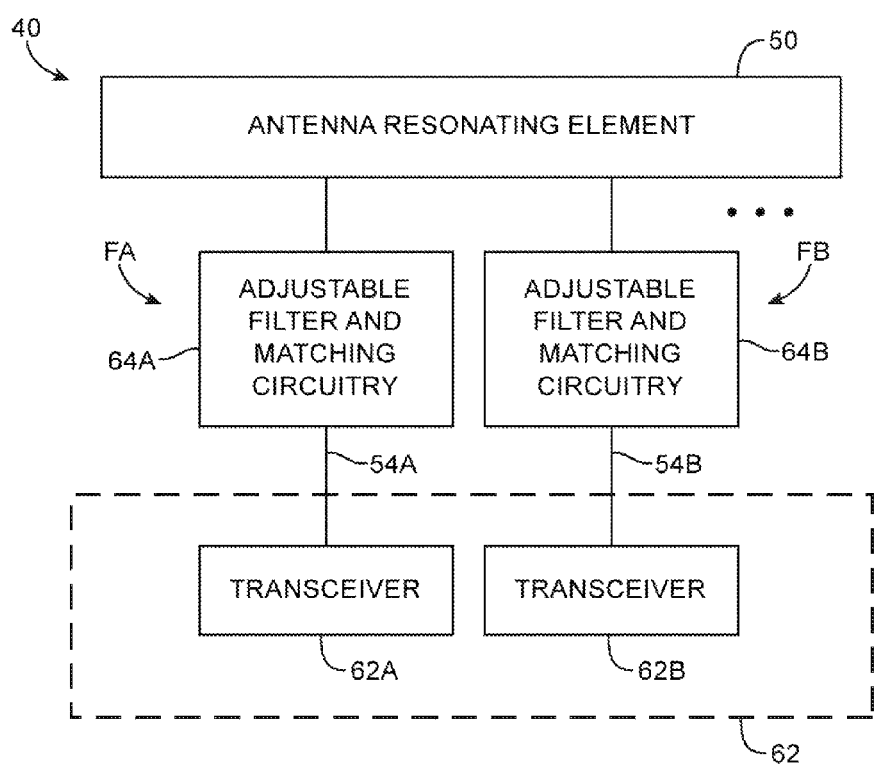
FIG. 9 is a diagram of illustrative antenna structures with adjustable filter and matching circuitry in accordance with an embodiment of the present invention.

Filter circuitry and impedance matching circuitry may be interposed in paths such as paths 54A and 54B. As shown in FIG. 9, for example, filter and impedance matching circuitry 64A may be interposed in path 54A between feed FA and transceiver 62A, so that signals that are transmitted and/or received using antenna feed FA are filtered by filter and impedance matching circuitry 64A. Filter and impedance matching circuitry 64B may likewise be interposed in path 54B, so that signals that are transmitted and/or received using antenna feed FB are filtered by filter and impedance matching circuitry 64B. Filter and matching circuitry 64A and 64B may include fixed and/or adjustable circuitry. In adjustable filter and matching circuit configurations, adjustable components may be placed in different states to adjust the signal transmittance and impedance characteristics of the circuits.

Circuits 64A and 64B may be configured so that the antenna feeds in antenna 40 operate satisfactorily, even in a configuration in which multiple feeds are coupled to antenna 40 simultaneously. Adjustable filter and matching circuitry 64A and/or 64B may, for example, be adjusted in real time by control circuitry 28 to optimize performance.

The adjustable filter and matching circuitry in device 10 may include circuitry that is adjusted to tune the frequency response of a filter and/or that is adjusted to tune the bandwidth of a filter. Consider, as an example, filter circuitry 98 of FIG. 10. Filter circuitry 98 of FIG. 10 may have two filters FW and FN coupled in series between terminals 96 and 94. Filter FW may include inductor 100 and parallel capacitor 104. Filter FN may include inductor 106 and parallel capacitor 108. Capacitors 104 and 108 may be adjusted to exhibit desired amounts of capacitance (e.g., to tune filter 98). Capacitance adjustments may be made in response to control signals from control circuitry 28 (e.g., a baseband processor or other controller).

Filters FW and FN may be band stop filters characterized by bandwidths BW and BN, respectively. Bandwidth BW may be larger than BN. As an example, bandwidth BW may be 400 MHz and BN may be 50 MHz. When it is desired to configure filter 98 to exhibit a large bandwidth (i.e., bandwidth BW), control circuitry 28 may open switch 102, thereby switching filter FW into use. When it is desired to configure filter 98 to exhibit a narrow bandwidth (i.e., bandwidth BN), control circuitry 28 may close switch 102, thereby bypassing band stop filter FW.

Figure 10:
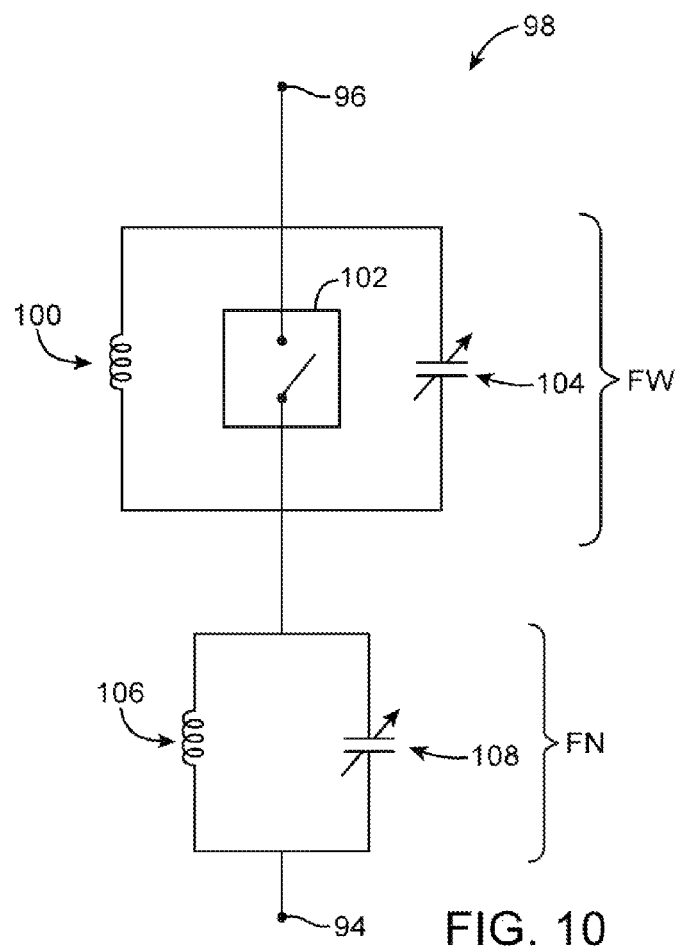
FIG. 10 is a diagram of an illustrative adjustable filter circuit having adjustable bandwidth and frequency tuning features in accordance with an embodiment of the present invention.
Figure 11:
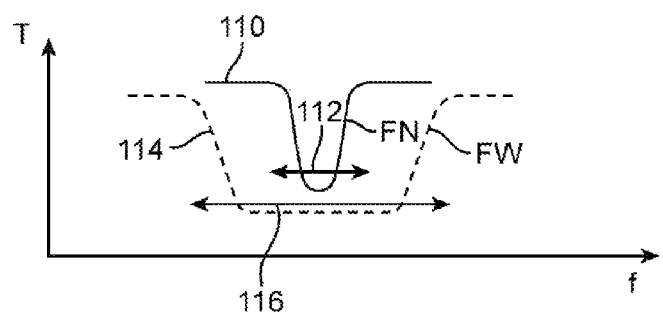
FIG. 11 is a graph of filter transmission as a function of operating frequency for an illustrative filter circuit of the type shown in FIG. 10 in accordance with an embodiment of the present invention.

FIG. 11 is a graph in which filter transmission T has been plotted as a function of operating frequency f for the illustrative filter circuitry of FIG. 10. As shown in FIG. 11, filter FN may be characterized by a narrower bandwidth than filter FW. When switch 102 is closed, filter FW will be bypassed and filter 98 will be characterized by a transmission T of the type shown by line 110. Adjustments 112 to the position of the stop band associated with curve 110 may be made by adjusting capacitor 108. When switch 102 is open, filter FW will be switched into use and filter 98 will be characterized by a transmission T of the type shown by line 114 of FIG. 11. Adjustments 116 to the position of the stop band associated with curve 114 may be made by adjusting capacitor 104.

The adjustable filter circuitry of FIG. 10 is merely illustrative. Adjustable tuning and matching circuitry for antenna structures 40 in device 10 may include band stop filters (e.g., band stop filters with fixed or adjustable bandwidths) that are coupled in series and/or parallel, band pass filters, notch filters, low pass filters, high pass filters, or other filters.

Figure 12:
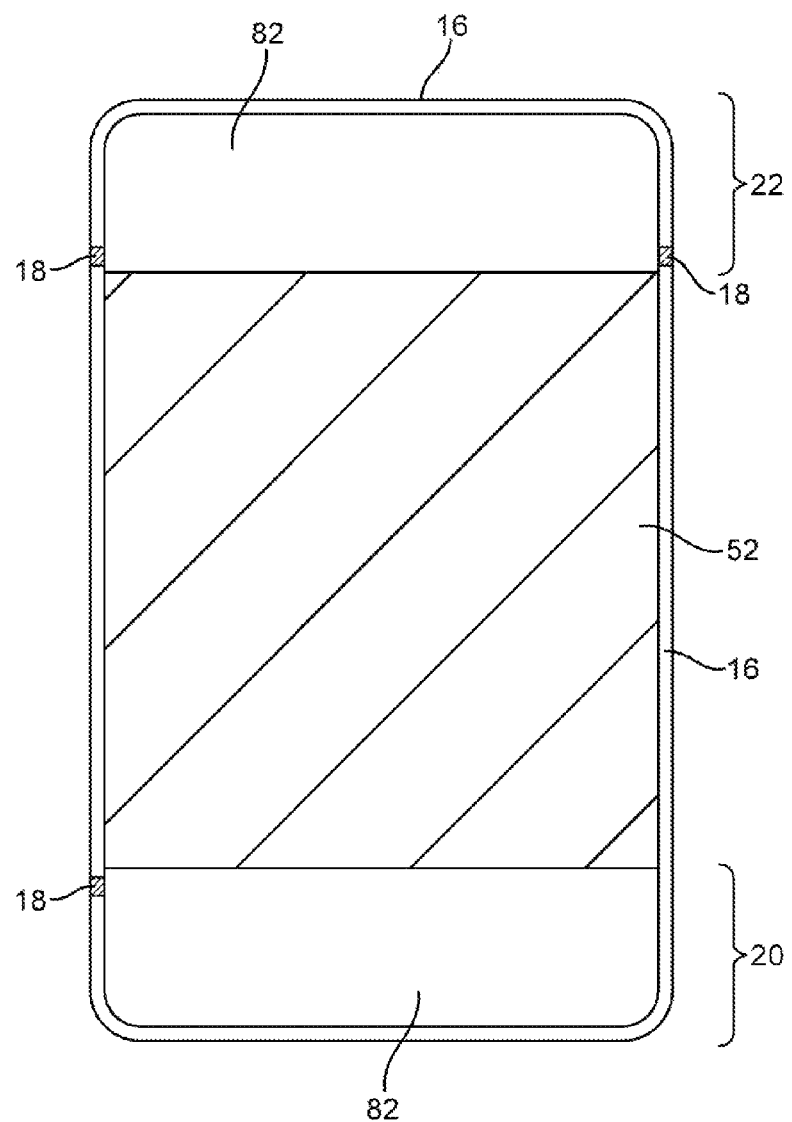
FIG. 12 is a top view of an illustrative electronic device of the type that may be provided with antenna structures in accordance with an embodiment of the present invention.

One or more antennas 40 in device 10 may be provided with filter and matching circuitry such as circuitry 64A and 64B. Antenna(s) 40 may be formed from conductive structures in device 10 such as portions of a peripheral conductive housing structure, other conductive housing structures, and other conductive structures in device 10. FIG. 12 is a top interior view of device 10 in a configuration in which device 10 has a peripheral conductive housing structure such as housing structure 16 of FIG. 1 with one or more gaps 18. As shown in FIG. 12, device 10 may have an antenna ground plane such as antenna ground plane 52. Ground plane 52 may be formed from traces on printed circuit boards (e.g., rigid printed circuit boards and flexible printed circuit boards), from conductive planar support structures in the interior of device 10, from conductive structures that form exterior parts of housing 12, from conductive structures that are part of one or more electrical components in device 10 (e.g., parts of connectors, switches, cameras, speakers, microphones, displays, buttons, etc.), or other conductive device structures. Gaps such as gaps 82 may be filled with air, plastic, or other dielectric.

Figure 14:
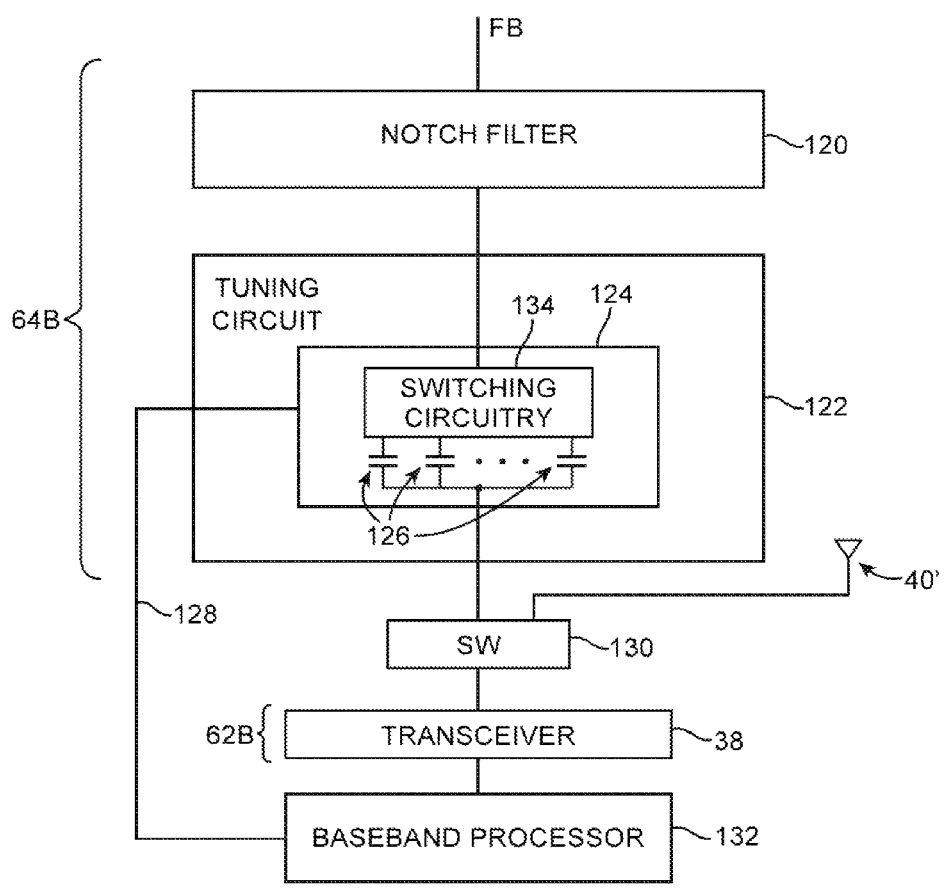
FIG. 14 is a diagram of adjustable circuitry of the type that may be coupled to one of the antenna feeds in the antenna structures of FIG. 13 in accordance with an embodiment of the present invention.

One or more segments of peripheral conductive member 16 may serve as antenna resonating elements such as antenna resonating element 50 of FIG. 3. For example, the uppermost segment of peripheral conductive member 16 in region 22 may serve as an antenna resonating element for an antenna 40 in device 10. The conductive materials of peripheral conductive member 16, the conductive materials of ground plane 52, and dielectric openings 82 (and gaps 18) may be used in forming one or more antennas in device 10 such as an upper antenna in region 22 and a lower antenna in region 20. Configurations in which an antenna in upper region 22 is implemented using a dual feed arrangement of the type described in connection with FIG. 14 are sometimes described herein as an example.

Figure 13:
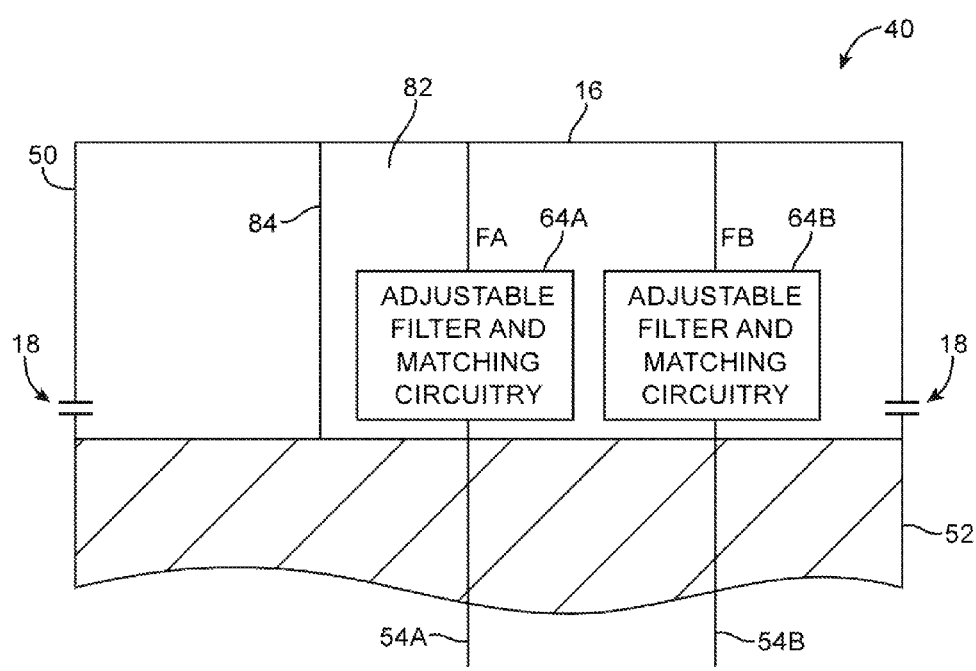
FIG. 13 is a diagram of illustrative antenna structures in an electronic device of the type shown in FIG. 12 in accordance with an embodiment of the present invention.

As shown in FIG. 13, antenna 40 may be a dual-arm inverted-F antenna (sometimes referred to as a T antenna). Resonating element 50 may have a main resonating element arm portion that is formed from a segment of peripheral conductive housing structure such as member 16 that extends between respective gaps 18 at one end of device 10 (e.g., the upper or lower end of device 10). Resonating element 50 may have first and second branches (e.g., a longer branch for handling lower frequencies and a shorter branch for handling higher frequencies). Other resonating element arm shapes may be used if desired. The use of a dual branch (dual arm) structure for antenna resonating element 50 is merely illustrative.

Return path 84 (sometimes referred to as a short circuit path) may be coupled between the main resonating element arm formed from segment 16 and antenna ground 52 across opening 82. Feeds FA and FB may span opening 82 in parallel with return path 84.

Antenna 40 may have adjustable filter and matching circuitry 64A and adjustable filter and matching circuitry 64B. Adjustable filter and matching circuitry 64A may be coupled to feed FA in path 54A. Adjustable filter and matching circuitry 64B may be coupled to feed FB in path 54B. Circuitry 64A and 64B may include antenna tuning circuitry. For example, circuitry 64B may include circuitry for tuning antenna performance in a cellular telephone band such as a cellular telephone band extending from 700 to 960 MHz. Circuitry 64A and 64B may also be adjusted to allow efficient operation of antenna 40 in desired bands of interest while blocking undesired coupling between feeds (ports) FA and FB.

To ensure that antenna 40 can operate efficiently when feed FB is active, it may be desirable to ensure that circuitry 64B is configured to impedance match path 54B to antenna 40. This helps prevent undesired signal reflections at the operating frequency associated with feed FB, so that signals can be efficiently transmitted and received through feed FB. At the same time, it may be desirable to ensure that circuitry 64A is configured to isolate antenna feed FA from antenna 40 at the operating frequency associated with feed FB. Circuitry 64A may, for example, be configured to create an open circuit or closed circuit at feed FA for signals at the current operating frequency associated with feed FB. By tuning circuitry 64A, adequate isolation of feed FA from feed FB at the current operating frequency associated with feed FB may be assured, even when antenna 40 in device 10 has been configured to be capable of operating over a wide range of communications bands. Although circuitry 64A will exhibit an impedance mismatch with antenna 40 at the operating frequency associated with feed FB to isolate feeds FB and FA from each other, circuitry 64A will preferably impedance match feed FA to antenna 40 at the operating frequency associated with feed FA. This allows antenna 40 to simultaneously use feed FB for handling signals at one frequency and feed FA for handling signals at another frequency.

Illustrative adjustable filter and matching circuitry that may be used to implement adjustable filter and matching circuitry 64B for coupling transceiver circuitry 62 to antenna 40 is shown in FIG. 14. Circuitry 64B may be coupled to feed FB of antenna 40 (e.g., antenna 40 of FIG. 13 or other suitable antenna 40). Baseband processor 132 may provide data to transceiver 38 for transmission over antenna 40 and may receive data from transceiver 38 that has been received over antenna 40. Baseband processor 132 (or other control circuitry 28) may also issue control signals to adjustable circuitry in circuitry 64B over paths such as path 128 (e.g., using digital signaling protocols such as serial bus protocols).

Switch 130 may be configured to couple transceiver 62B to antenna 40' when antenna 40 is not being used (e.g., because antenna 40 is impaired or because antenna 40' is otherwise favored over antenna 40). Switch 130 may be configured to couple transceiver 62B to antenna 40 via circuitry 64B when antenna 40 is being used. Baseband processor 132 or other control circuitry in device 10 may be use to control the state of switch 130.

Transceiver 62B may be a cellular telephone transceiver (e.g., transceiver 38 of FIG. 2) that is configured to operate in a low band at 700-960 MHz, a middle band at 1700-2170 MHz, and a high band at 2300-2700 MHz (as an example). Transceiver 62A may be a satellite navigation system receiver such as a Global Positioning System (GPS) receiver operating at a frequency such as 1575 MHz (see, e.g., satellite navigation system receiver 35 of FIG. 2).

Adjustable circuitry 64B may include a notch filter such as notch filter 120. Notch filter 120 may exhibit a low transmittance (i.e., a notch) at 1575 MHz. This low transmittance is associated with an impedance mismatch between antenna 40 and feed FB at 1575 MHz and isolates feed FB from antenna 40 and feed FA at 1575 MHz. By isolating feed FB from antenna 40 at 1575 MHz, the presence of feed FB will not adversely affect the performance of antenna 40 and feed FA in receiving satellite navigation system signals at 1575 MHz.

At frequencies other than the notch frequency (i.e., at frequencies other than 1575 MHz such as the low, middle, and high cellular telephone bands), notch filter 120 may exhibit a high transmission, thereby allowing transceiver 62B and antenna 40 to be used in transmitting and/or receiving signals.

If desired, circuitry 64B may include antenna tuning circuitry 122. Tuning circuitry 122 may be adjusted in real time based on control signals from baseband processor 132 on path 128 to tune the frequency response of antenna 40 in the low, middle, or high band of antenna 40 that is being used by feed FB. In the example of FIG. 14, tuning circuitry 122 includes adjustable capacitor 124. Adjustable capacitor 124 includes switching circuitry 134 for selectively switching capacitors 126 into use. Adjustable capacitor 124 can switch a selected set of one or more capacitors 124 into use or can switch a short circuit into use, thereby adjusting the capacitance interposed between switch 130 and notch filter 120. The capacitance value used for capacitor 124 may tune the frequency response for antenna 40 when using feed FB. For example, adjustment of the capacitance exhibited by capacitor 124 may tune a low band resonant peak for antenna 40 between one of several different possible resonant peak locations within the low cellular telephone band (e.g., two, three, or four or more peak positions within the band from 700 to 960 MHz). Middle and high band performance may not be significantly affected by adjustments to capacitor 124. Other types of antenna tuning may be implemented using tunable circuitry such as tuning circuit 122. The illustrative configuration of FIG. 14 is merely an example.

To ensure that antenna performance for antenna 40 when using feed FB is not degraded by the presence of undesired coupling into feed FA, adjustable filter 64A for feed FA may be configured to exhibit an impedance mismatch with antenna 40 (e.g., an open circuit or short circuit) at the operating frequency associated with the low, middle, or high cellular telephone band being handled by feed FB. The impedance mismatch between circuitry 64A and antenna 40 at the operating frequencies for feed FB will ensure that feed FA is isolated from feed FB at the operating frequencies associated with feed FB, so that the presence of feed FA will not adversely influence the performance of antenna 40 at the operating frequencies associated with feed FB.

It can be challenging to configure circuitry 64A to isolate feed FA from feed FB, particularly when feed FB is capable of being used over a wide range of operating frequencies. Accordingly, circuitry 64A may be provided with tunable circuitry. The tunable circuitry allows circuitry 64A to be adjusted to form a satisfactory impedance mismatch with antenna 40 for each potential operating frequency of feed FB. If, for example, feed FB is capable of handling cellular telephone signals in the low, middle, and high cellular telephone bands, circuitry 64A can be placed in a first configuration whenever feed FB is being operated in the low band, a second configuration whenever feed FB is being operated in the middle band, and a third configuration whenever feed FB is being operated in the high band.

Figure 15:
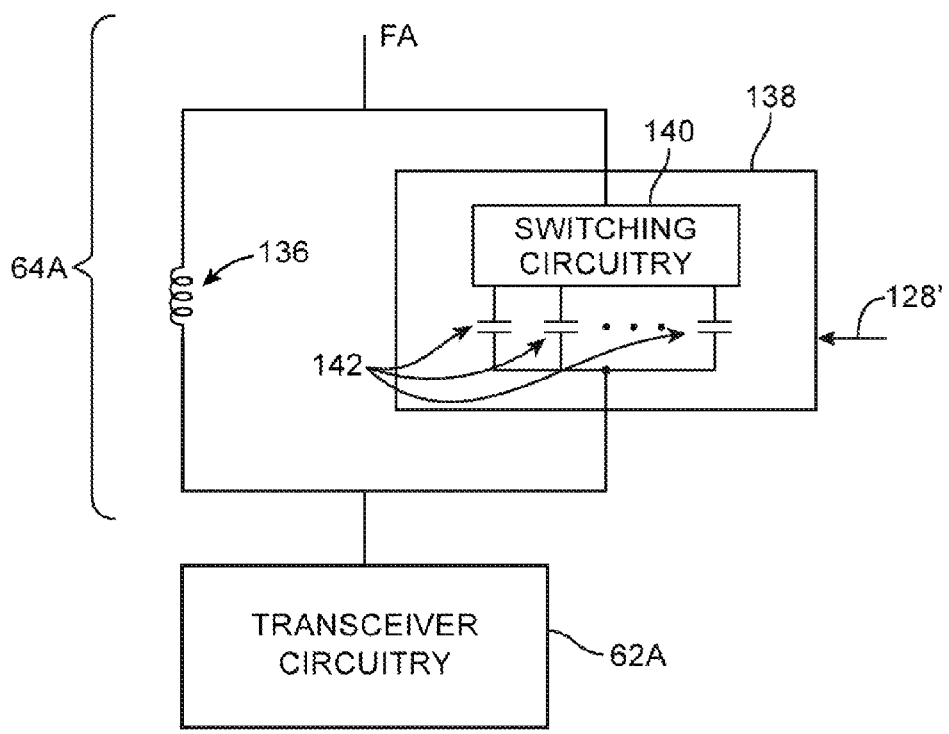
FIG. 15 is a diagram of adjustable circuitry of the type that may be coupled to another of the antenna feeds in the antenna structures of FIG. 13 in accordance with an embodiment of the present invention.

Adjustable circuitry 64A may include adjustable inductors, adjustable capacitors, and other adjustable circuitry. In the example of FIG. 15, adjustable circuitry 64A is a band stop filter having an inductor such as inductor 136 coupled in parallel with adjustable capacitor 138 between feed FA and transceiver circuitry (e.g., satellite navigation system transceiver circuitry) 62A. Adjustable capacitor 138 may have switching circuitry 140 that is controlled by control signals from baseband processor 132 that are received on control path 128'. Adjustable capacitor 138 may also have capacitors 142. Capacitors 142 may have different values. Switching circuitry 140 can switch one or more selected capacitors 142 into use or can switch a short circuit into use to create a desired amount of capacitance between feed FA and transceiver circuitry 62A in parallel with inductor 136. Different capacitor settings may be used whenever it is desired to optimize the configuration of circuitry 64A to ensure adequate isolation between feeds FA and FB at the current operating frequency of feed FB.

FIG. 16 is a table showing how the amount of isolation between feeds FA and FB can be influenced by the operating frequency of the signals associated with feed FB and the setting of circuitry 64A. In the example of FIG. 16, device 10 is using transceiver 62B to handle three different communications bands—a first (low) cellular telephone band extending from 700 to 960 MHz, a second (middle) cellular telephone band extending from 1710 to 2170 MHz, and a third (high) cellular telephone band extending from 2300 to 2700 MHz. There are three different possible capacitance settings for circuitry 64A (which is located on the other feed-feed FA). As shown in the first row of the table of FIG. 16, when using feed FB to handle low band signals, optimum isolation of feed FA from feed FB and therefore optimum performance of antenna 40 for the low band signals passing through feed FB can be achieved when setting capacitor 138 of circuitry 64A to a capacitance value of C1, whereas less than optimum isolation between feeds FA and FB and less than optimum performance of antenna 40 is achieved when using capacitance values C2 and C3. The entries of the second row of the table of FIG. 16 show that capacitor 138 should be set to capacitor value C2 to achieve optimum performance when operating feed FB in the middle band. High band performance can be optimized for feed FB by setting capacitor 138 to a third value of capacitance C3, as shown by the entries in the third row of the table of FIG. 16. Capacitance values C1, C2, and C3 are typically different from each other. When C1 is switched into use, the stop band of circuitry 64A may be aligned with the low band, when C2 is switched into use, the stop band of circuitry 64A may be aligned with the middle band, and when C3 is switched into use, the stop band of circuitry 64A may be aligned with the high band.

Figure 17:
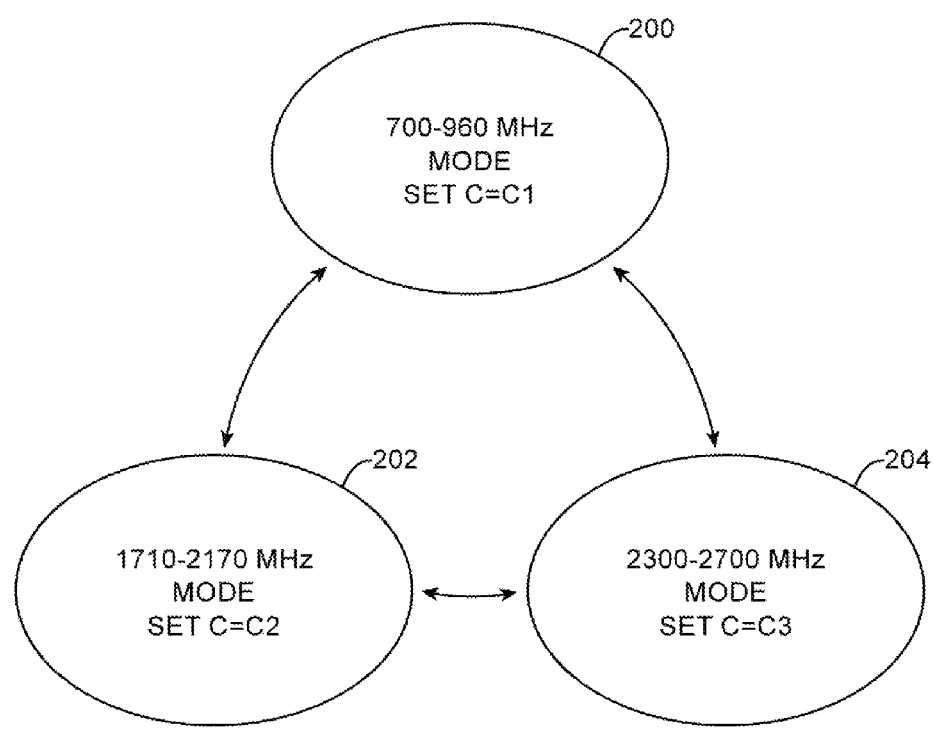
FIG. 17 is a state diagram showing different illustrative modes of operation for an electronic device in accordance with an embodiment of the present invention.

FIG. 17 is a diagram of illustrative modes of operation that may be used for wireless circuitry 34 in device 10. During operation of device 10, control circuitry 28 can adjust circuitry such as circuitry 64A (and circuitry 64B) dynamically based on knowledge (e.g., from baseband processor 132) of which cellular telephone frequencies are currently being handled by transceiver circuitry 62B. For example, when device 10 is operating in mode 200 (sometimes referred to as a low band mode), cellular telephone transceiver circuitry 62B may transmit and receive cellular telephone signals in the range of 700 MHz to 960 MHz while control circuitry 28 places circuit 64A in a first state (i.e., while control circuitry 28 configures capacitor 138 in circuitry 64A to exhibit a capacitance value of C1). The C1 capacitance value will align the stop band of circuitry 64A with the low band from 700 MHz to 960 MHz and will thereby ensure that feed FA is isolated from feed FB in the low band. During low band operations, circuit 64B may be adjusted to tune the antenna resonance of antenna 40 in the low band.

When device 10 is operating in mode 202 (sometimes referred to as a middle band mode), cellular telephone transceiver circuitry 62B may transmit and receive signals in the range of 1710 MHz to 2170 MHz while control circuitry 28 places circuitry 64A in a second state (i.e., while capacitor 138 in circuitry 64A is set to exhibit a capacitance value of C2). The value of C2 will ensure that feeds FA and FB are isolated in the middle band so that antenna 40 can perform efficiently in the middle band when using feed FB.

xx Mode 204 (sometimes referred to as a high band cellular telephone mode) may involve transmitting and receiving high band cellular telephone signals with feed FB (i.e., signals in a frequency range of 2300 MHz to 2700 MHz). In this mode control circuitry 28 may adjust circuitry 64A to place circuitry 64A in a third mode (i.e., a mode in which capacitor 138 is set to C3 to ensure satisfactory isolation between feeds FA and feed FB and satisfactory performance (antenna efficiency) for antenna 40 when using feed FB.

The foregoing is merely illustrative of the principles of this invention and various modifications can be made by those skilled in the art without departing from the scope and spirit of the invention.

What is claimed is:

1. An electronic device, comprising:
an antenna having first and second feeds;
a first radio-frequency transceiver circuit operable in at least a first communications band;
a second radio-frequency transceiver circuit operable in at least second and third communications bands;
a first circuit coupled between the first radio-frequency transceiver circuit and the first feed;
a second circuit coupled between the second radio-frequency transceiver circuit and the second feed, wherein the first and second circuits are formed from separate components; and
control circuitry configured to place the first circuit in a first state while operating the second radio-frequency transceiver circuit in the second communications band and configured to place the first circuit in a second state that is different from the first state while operating the second radio-frequency transceiver circuit in the third communications band.

2. The electronic device defined in claim 1 wherein the second radio-frequency transceiver circuit is further operable in a fourth communications band and wherein the control circuitry is further configured to place the first circuit in a third state that is different from the first and second states while operating the second radio-frequency transceiver circuit in the fourth communications band.

3. The electronic device defined in claim 2 wherein the first radio-frequency transceiver circuit is configured to receive signals with the antenna in the first communications band while the second radio-frequency transceiver circuit transmits signals with the antenna in the second communications band.

4. The electronic device defined in claim 3 wherein the first communications band is a satellite navigation system communications band, wherein the second, third, and fourth communications bands are cellular telephone communications bands, and wherein the first circuit comprises an inductor.

5. The electronic device defined in claim 4 wherein the first circuit comprises an adjustable capacitor.

6. The electronic device defined in claim 5 wherein the adjustable capacitor is coupled in parallel with the inductor between the first feed and the first radio-frequency transceiver circuit.

7. The electronic device defined in claim 6 wherein the adjustable capacitor is configured to exhibit a first capacitance in the first state, a second capacitance that is different from the first capacitance in the second state, and a third capacitance that is different from the first and second capacitances in the third state.

8. The electronic device defined in claim 7 wherein the second circuit comprises a tuning circuit that is configured to tune the antenna.

9. The electronic device defined in claim 8 wherein the control circuitry is configured to tune the tuning circuit to exhibit a selected capacitance value, wherein the tuning circuit adjusts an antenna resonance for the antenna in the second communications band.

10. The electronic device defined in claim 1 wherein the first circuit comprises an adjustable band stop filter.

11. The electronic device defined in claim 10 wherein the first feed is isolated from the second feed in the second communications band when the first circuit is placed in the first state and wherein the first feed is isolated from the second feed in the third communications band when the first circuit is placed in the second state.

12. The electronic device defined in claim 11 further comprising a conductive housing structure that forms part of the antenna.

13. The electronic device defined in claim 12, wherein the electronic device has a rectangular periphery and wherein the conductive housing structure comprises a segment of a metal peripheral conductive housing structure that runs around the rectangular periphery.

14. The electronic device defined in claim 12 wherein the antenna comprises an inverted-F antenna.

15. Apparatus, comprising:
an antenna resonating element;
an antenna ground;
a return path between the antenna resonating element and the antenna ground;
a first feed coupled to the antenna resonating element;
a second feed coupled to the antenna resonating element;
a first transceiver;
a first circuit coupled between the first feed and the first transceiver;
a second transceiver; and
a second circuit coupled between the second feed and the second transceiver, wherein the second circuit is separate from the first circuit and the first circuit comprises an adjustable capacitor that is adjusted to isolate the first feed from the second feed at signal frequencies associated with operation of the second transceiver.

16. The apparatus defined in claim 15 further comprising a peripheral conductive housing structure that forms at least part of the antenna resonating element.

17. The apparatus defined in claim 16 further comprising an inductor coupled in parallel with the adjustable capacitor.

18. The apparatus defined in claim 17 wherein the second circuit includes a notch filter.

19. An electronic device, comprising:
an antenna having at least first and second feeds;
a first circuit coupled to the first feed;
a second circuit coupled to the second feed;
a satellite navigation system transceiver that receives signals from the antenna through the first circuit;
a cellular telephone transceiver operable in at least first, second, and third communications bands, wherein the first circuit has an adjustable component with a first setting that isolates the first feed from the second feed when the cellular telephone transceiver transmits signals with the antenna through the second circuit in the first communications band, a second setting that isolates the first feed from the second feed when the cellular telephone transceiver transmits signals with the antenna through the second circuit in the second communications band, and a third setting that isolates the first feed from the second feed when the cellular telephone transceiver transmits signals with the antenna through the second circuit in the third communications band.

20. The electronic device defined in claim 19, wherein the adjustable component comprises an adjustable capacitor, the first communications band includes at least one frequency from 700 to 960 MHz, the second communications band includes at least one frequency from 1710 to 2170 MHz, and the third communications band includes at least one frequency from 2300 to 2700 MHz.

* * * * *